(12) United States Patent
Chou

(10) Patent No.: US 6,651,523 B2
(45) Date of Patent: Nov. 25, 2003

(54) AUTOMATIC TENSION DEVICE OF A BRAKE

(76) Inventor: Feng-Yao Chou, 58, Ma Yuan West St., Taichung (TW)

( * ) Notice: Subject to any disclaimer, the term of this patent is extended or adjusted under 35 U.S.C. 154(b) by 54 days.

(21) Appl. No.: 10/112,904

(22) Filed: Mar. 29, 2002

(65) Prior Publication Data

US 2003/0183036 A1 Oct. 2, 2003

(51) Int. Cl.[7] .............................. F16C 1/10; B62L 3/00
(52) U.S. Cl. ..................... 74/502.2; 74/488; 74/489; 188/24.11
(58) Field of Search ..................... 74/500.5–502.6, 74/487, 488, 489; 188/24.11, 24.14, 24.15, 2 D

(56) References Cited

U.S. PATENT DOCUMENTS

| 3,732,787 A | * | 5/1973 | Yamaguchi | ............... 74/625 X |
| 4,850,456 A | * | 7/1989 | Chi | .................. 188/24.19 |
| 5,660,082 A | * | 8/1997 | Hsieh | .................. 74/502.2 |
| 5,669,268 A | * | 9/1997 | Tsai | ..................... 74/489 |
| 5,778,729 A | * | 7/1998 | Tsai | ..................... 74/489 |
| 5,966,993 A | * | 10/1999 | Ekins | ................... 74/502.2 |
| 6,161,448 A | * | 12/2000 | Wang | .................. 74/502.2 |
| 6,328,138 B1 | * | 12/2001 | Takizawa | .............. 188/24.11 |

FOREIGN PATENT DOCUMENTS

| JP | 62-231857 | * | 10/1987 | .................. 74/512 |
| JP | 4-2588 | * | 1/1992 | ................ 74/502.2 |

* cited by examiner

Primary Examiner—Vinh T. Luong

(57) ABSTRACT

An automatic tension device of a brake includes a fixing base, a brake lever, a worm, a worm wheel, a gap adjusting screw, a pull hook, a cable guide seat, and a cable. The brake lever is pivotally mounted on the fixing base. The worm has one end having a periphery provided with one-direction ratchet teeth. The gap adjusting screw has a through hole for passage of the cable and has an outer thread screwed into the inner thread of the worm wheel. The pull hook is provided with an one-direction ratchet tooth that may be locked with one of the one-direction ratchet teeth of the worm. Thus, the automatic tension device may be used to adjust and shorten the braking gap between the brake pad and the tire automatically.

12 Claims, 7 Drawing Sheets

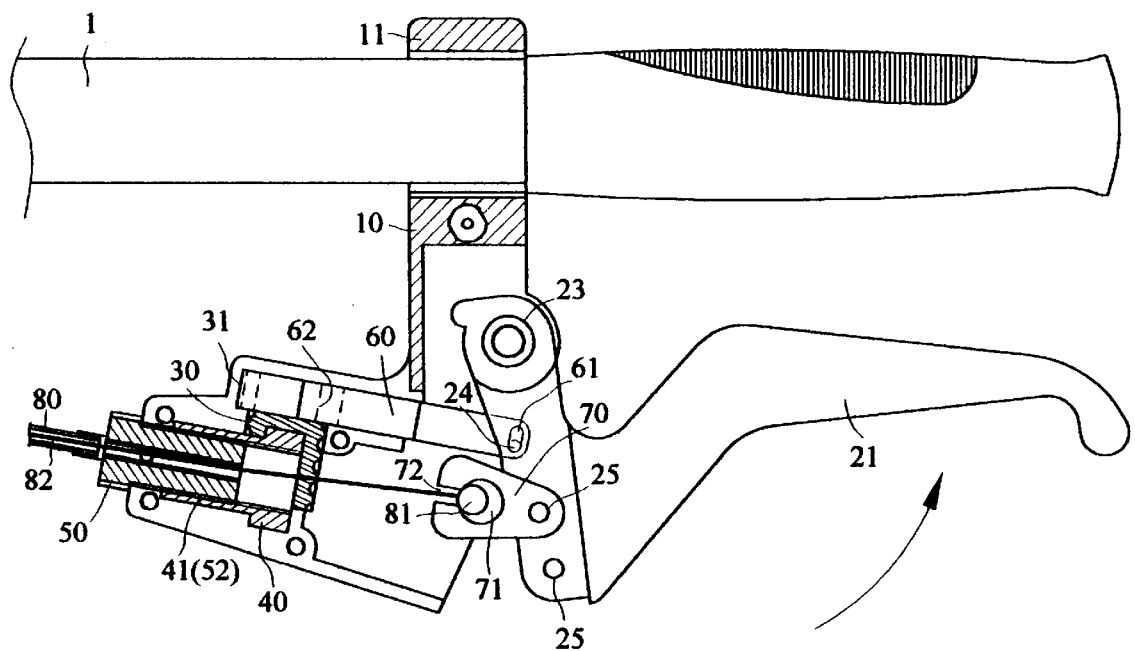
F I G. 6A
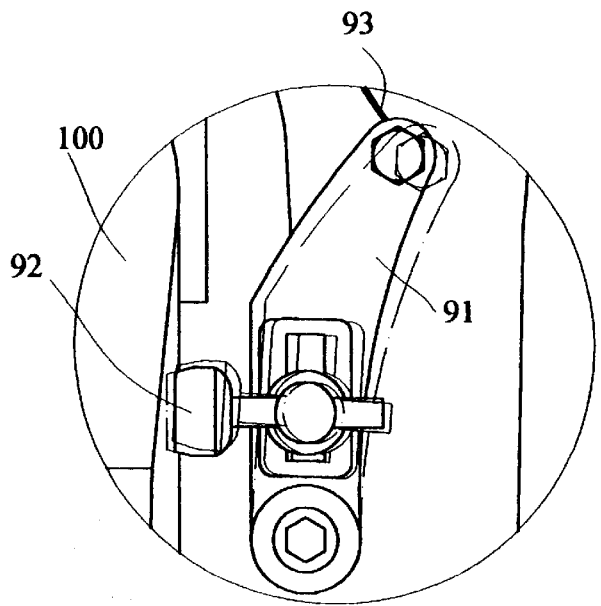
F I G. 6B

AUTOMATIC TENSION DEVICE OF A BRAKE

BACKGROUND OF THE INVENTION

1. Field of the Invention

The present invention relates to an automatic tension device of a brake, and more particularly to an automatic tension device of a brake of a bicycle, wherein the automatic tension device may be used to adjust and shorten the braking gap between the brake pad and the tire automatically.

2. Description of the Related Art

A conventional tension device of a brake in accordance with the prior art is shown in FIG. 1. The handlebar 1A is provided with a fixing base 2, and a brake lever 3 is pivotally mounted on the fixing base , 2. A cable guide seat 4 is mounted on the brake lever 3. The cable 5 has a first end secured to the cable guide seat 4 and a second end connected to a brake pad (not shown). A cable protection sheath 6 is mounted around the cable 6. A gap adjusting screw 7 is mounted on the fixing seat 2. The brake lever 3 may be pressed to draw the cable 5, thereby braking the bicycle. When the brake pad is worn to reduce its thickness, the gap adjusting screw 7 may be rotated to squeeze the cable protection sheath 6, thereby increasing the distance of the bushing of the cable protection sheath 6, so that the cable 5 may be lifted, thereby shortening the braking gap between the brake pad and the tire (not shown), so as to adjust the braking gap. However, the conventional tension device of a brake in accordance with the prior art is operated manually, thereby causing inconvenience to the user.

SUMMARY OF THE INVENTION

The present invention has arisen to mitigate and/or obviate the disadvantage of the conventional tension device of a brake.

The primary objective of the present invention is to provide an automatic tension device of a brake, wherein the automatic tension device may be used to adjust and shorten the braking gap between the brake pad and the tire automatically.

In accordance with the present invention, there is provided an automatic tension device of a brake, comprising a fixing base, a brake lever, a worm, a worm wheel, a gap adjusting screw, a pull hook, a cable guide seat, and a cable, wherein:

the brake lever is pivotally mounted on the fixing base;
the worm is received in the fixing base, and has one end having a periphery provided with multiple one-direction ratchet teeth;
the worm wheel is received in the fixing base and meshes with the worm, the worm wheel has an inner wall formed with an inner thread;
the gap adjusting screw is received in the fixing base, the gap adjusting screw has an inner wall formed with a through hole for passage of the cable and has an outer wall formed with an outer thread screwed into the inner thread of the worm wheel;
the pull hook is pivotally mounted on the brake lever, and is provided with an one-direction ratchet tooth that may be locked with one of the multiple one-direction ratchet teeth of the worm;
the cable guide seat is mounted on the brake lever; and
the cable is extended through the through hole of the gap adjusting screw and is secured on the cable guide seat.

Further benefits and advantages of the present invention will become apparent after a careful reading of the detailed description with appropriate reference to the accompanying drawings.

BRIEF DESCRIPTION OF THE DRAWINGS

FIG. 4A is a plan cross-sectional assembly view of the automatic tension device of a brake as shown in FIG. 4;

FIG. 5A is a plan cross-sectional assembly view of the automatic tension device of a brake as shown in FIG. 5;

FIG. 6A is a plan cross-sectional assembly view of the automatic tension device of a brake as shown in FIG. 2; and FIG. 6B is a partially cut-away enlarged view of the automatic tension device of a brake as shown in FIG. 6.

DETAILED DESCRIPTION OF THE INVENTION

Figure 1:
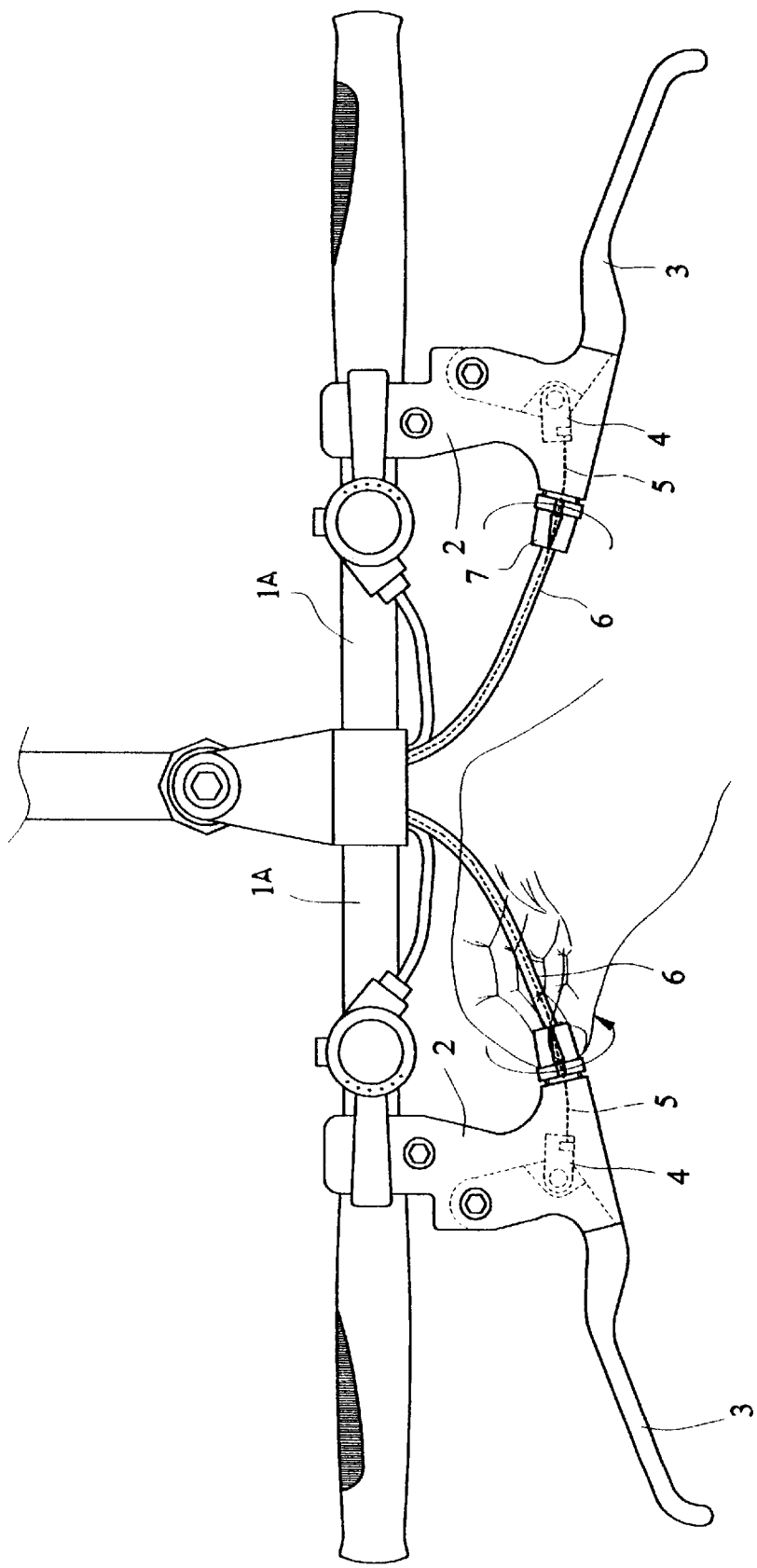
FIG. 1 is a plan view of a conventional tension device of a brake in accordance with the prior art.
Figure 2:
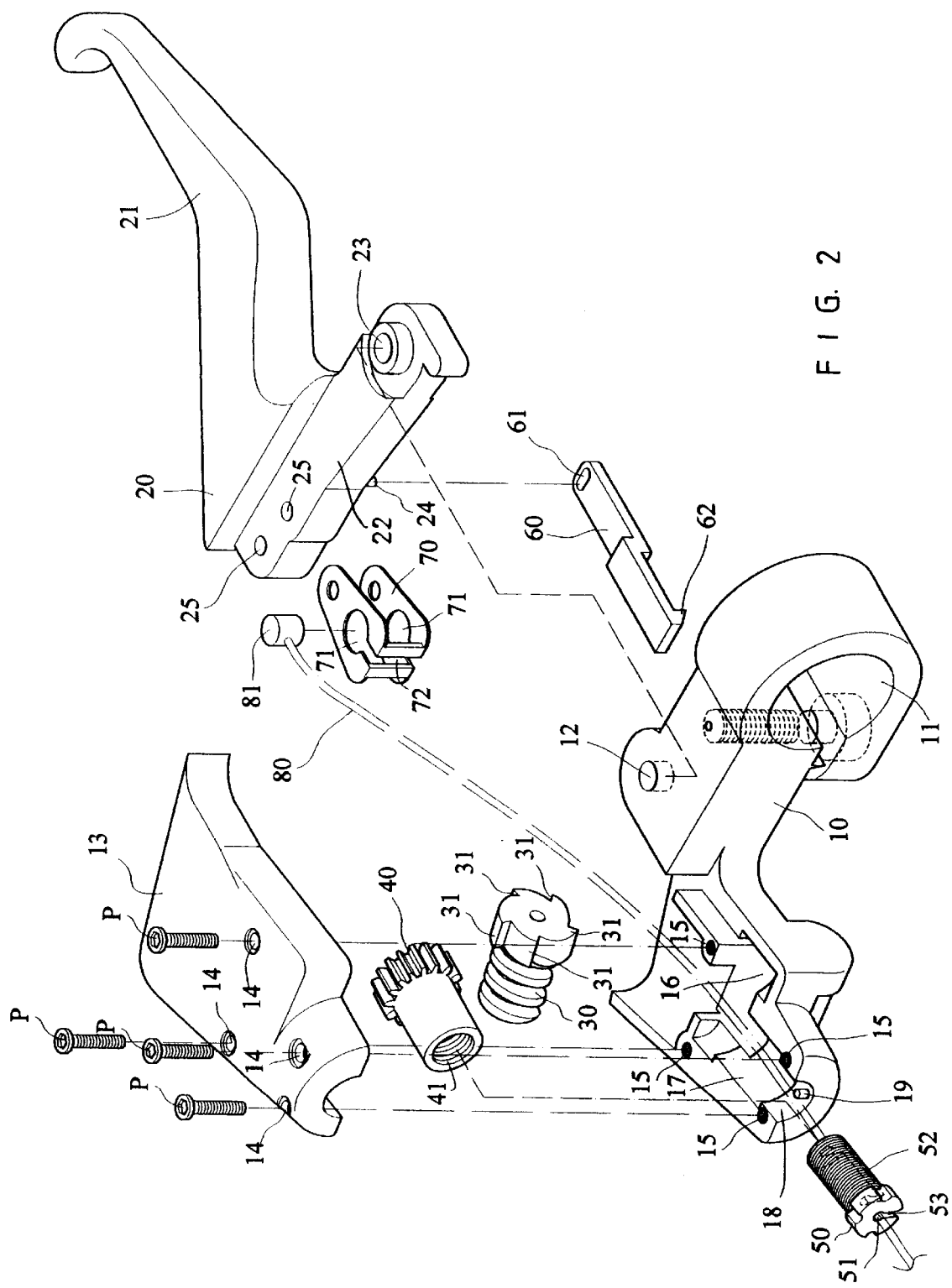
FIG. 2 is an exploded perspective view of an automatic tension device of a brake in accordance with a preferred embodiment of the present invention.
Figure 3:
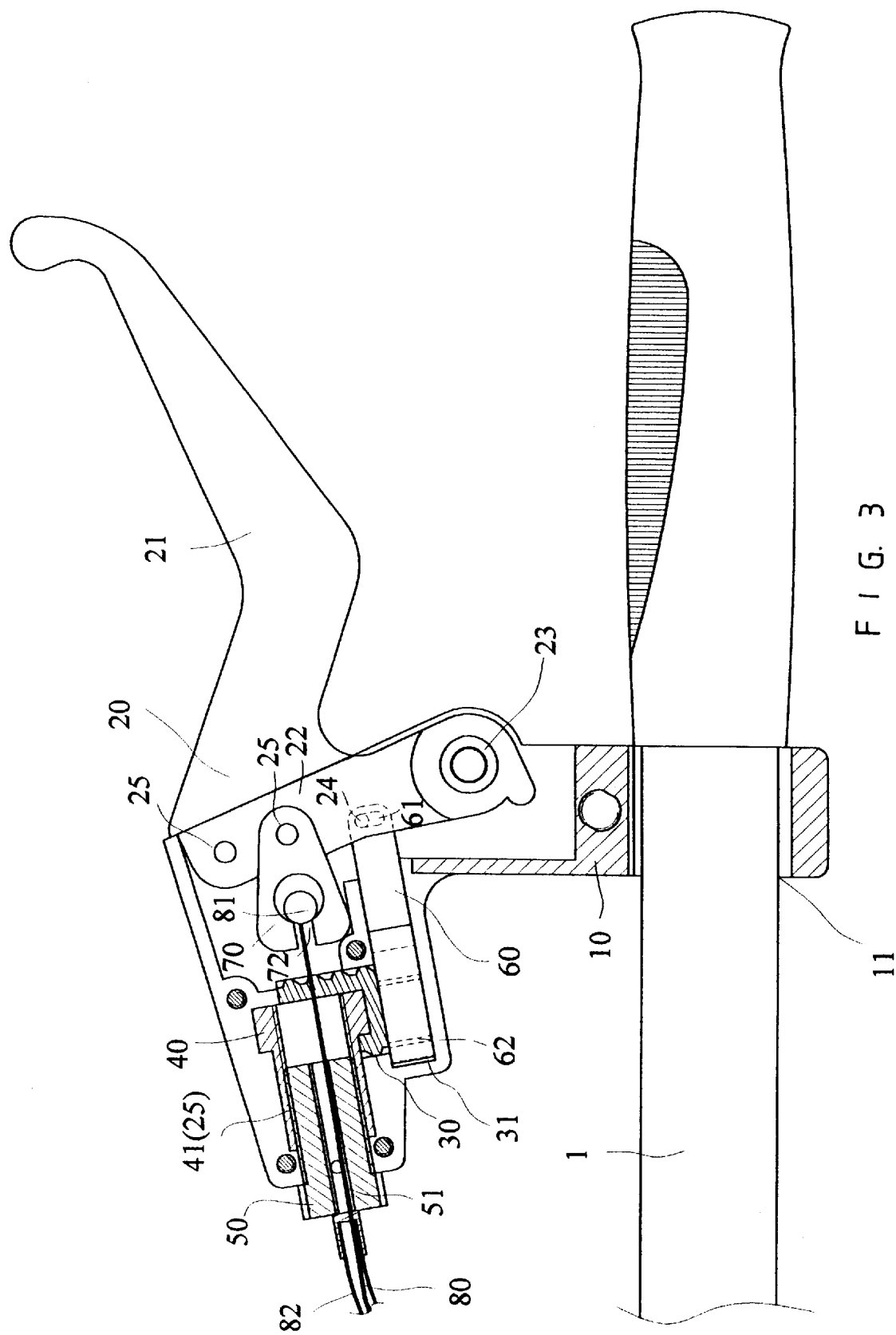
FIG. 3 is a plan cross-sectional assembly view of the automatic tension device of a brake as shown in FIG. 2.

Referring to the drawings and initially to FIGS. 2 and 3, an automatic tension device of a brake in accordance with a preferred embodiment of the present invention comprises a fixing base 10, a brake lever 20, a worm 30, a worm wheel 40, a gap adjusting screw 50, a pull hook 60, a cable guide seat 70, and a cable 80.

The fixing base 10 is secured on a handlebar 1 of a bicycle and is formed with a pivot hole 12 for pivoting the brake lever 20. The fixing base 10 has a first side formed with a mounting hole 11 for mounting the handlebar 1 of the bicycle, and a second side formed with a first shaft seat 16, a second shaft seat 17 communicating with the first shaft seat 16, and a through hole 18 communicating with the second shaft seat 17.

The second side of the fixing base 10 has a periphery formed with multiple screw bores 15. A top cover 13 is secured on the second side of the fixing base 10, and has a periphery formed with multiple through holes 14. Multiple screws "P" are in turn extended through the through holes 14 of the top cover 13, and are screwed into the screw bores 15 of the fixing base 10, so that the top cover 13 is secured on the second side of the fixing base 10.

The worm 30 is received in the first shaft seat 16 of the fixing base 10, and has one end having a periphery provided with multiple one-direction ratchet teeth 31.

The worm wheel 40 is received in the second shaft seat 17 of the fixing base 10 and meshes with the worm 30. The worm wheel 40 has an inner wall formed with an inner thread 41.

The gap adjusting screw 50 is received in the through hole 18 of the fixing base 10. The gap adjusting screw 50 has an inner wall formed with a through hole 51 for passage of the cable 80, and has an outer wall formed with an outer thread 52 screwed into the inner thread 41 of the worm wheel 40.

The through hole 18 of the fixing base 10 is provided with a positioning post 19. The outer wall of the gap adjusting screw 50 is formed with a positioning groove 53 for receiving the positioning post 19 of the fixing base 10. Thus, when the worm wheel 40 is rotated, the positioning groove 53 of the gap adjusting screw 50 is limited by the positioning post 19 of the fixing base 10, so that the gap adjusting screw 50 can only move axially in a linear manner, and cannot be rotated with the worm wheel 40.

The brake lever 20 has a first side provided with a press portion 21, and a second side provided with a drive arm 22 which is in turn provided with a pivot seat 23, a guide rod 24, and at least one pivot hole 25.

The pivot seat 23 of the drive arm 22 of the brake lever 20 is pivotally mounted in the pivot hole 12 of the fixing base 10.

The guide rod 24 of the drive arm 22 of the brake lever 20 is pivotally mounted on the pull hook 60. The pull hook 60 has a first end formed with an oblong slot 61 for receiving the guide rod 24 of the drive arm 22 of the brake lever 20, and has a second end formed with an one-direction ratchet tooth 62 that may be locked with one of the multiple one-direction ratchet teeth 31 of the worm 30.

The cable guide seat 70 is pivotally mounted on the pivot hole 25 of the drive arm 22 of the brake lever 20. The cable guide seat 70 is in turn formed with a central hole 71, and a slit 72 communicating with the central hole 71.

Figure 6:
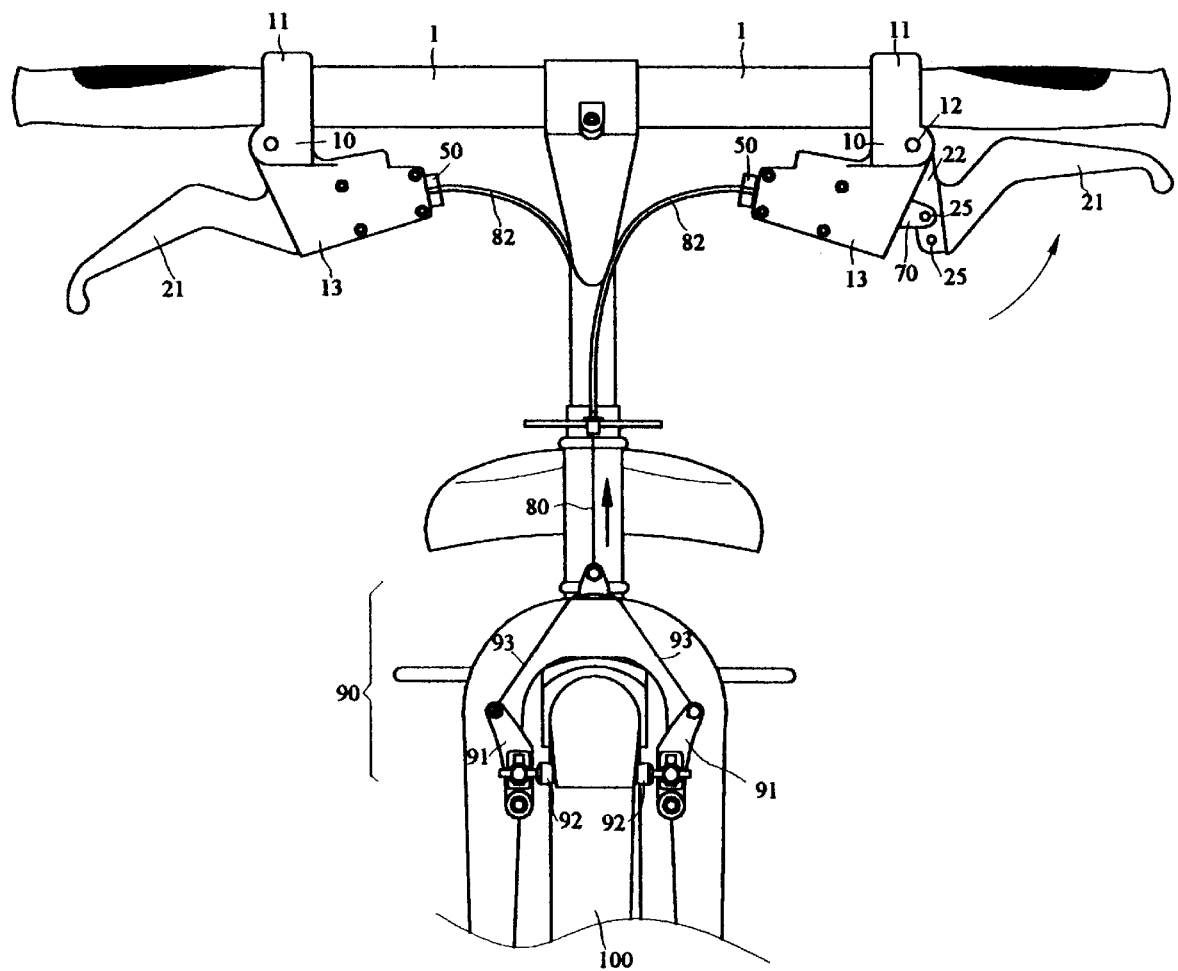
FIG. 6 is a schematic plan view of an automatic tension device of a brake in accordance with a preferred embodiment of the present invention.

The cable 80 has a first end extended through the slit 72 of the cable guide seat 70 and provided with a positioning stud 81 secured in the central hole 71 of the cable guide seat 70. As shown in FIGS. 2 and 6, the cable 80 has a second end which is passed through the through hole 51 of the gap adjusting 10 screw 50 and through a cable protection sheath 82, and is directly connected to a brake 90.

The brake 90 includes two swing arms 91 and two brake pads 92 mounted on two sides of a tire 100 of the bicycle, and two connecting cables 93 connected between the two swing arms 91 and the cable 80. Thus, when the brake lever 20 is pressed, the cable 80 is pulled upward to pull the connecting cables 93 upward, so that the two swing arms 91 are pivoted to move the brake pads 92 to touch and rub the tire 100, thereby providing a braking effect.

Figure 4:
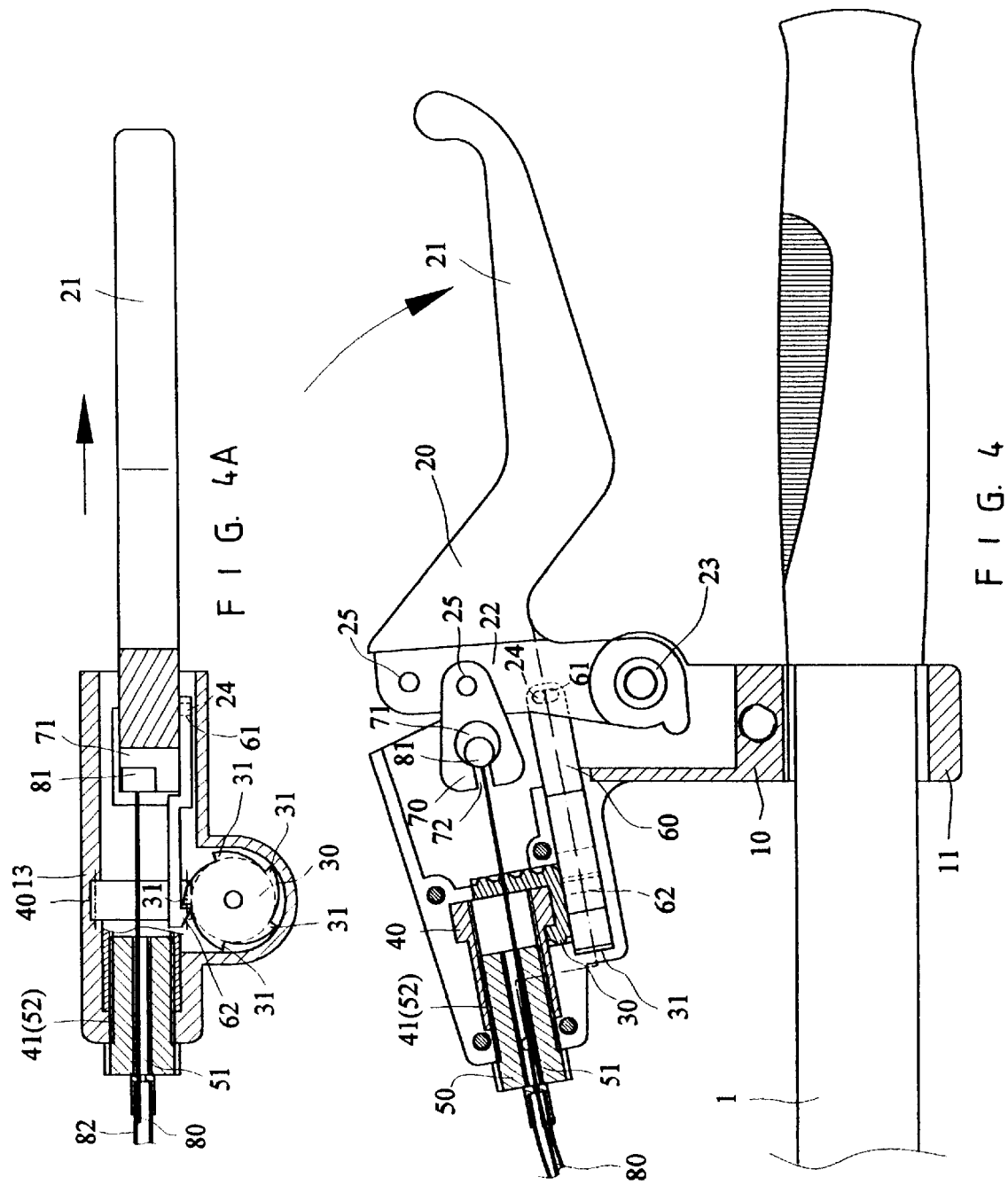
FIG. 4 is a schematic operational view of the automatic tension device of a brake as shown in FIG. 3 in use.
Figure 5:
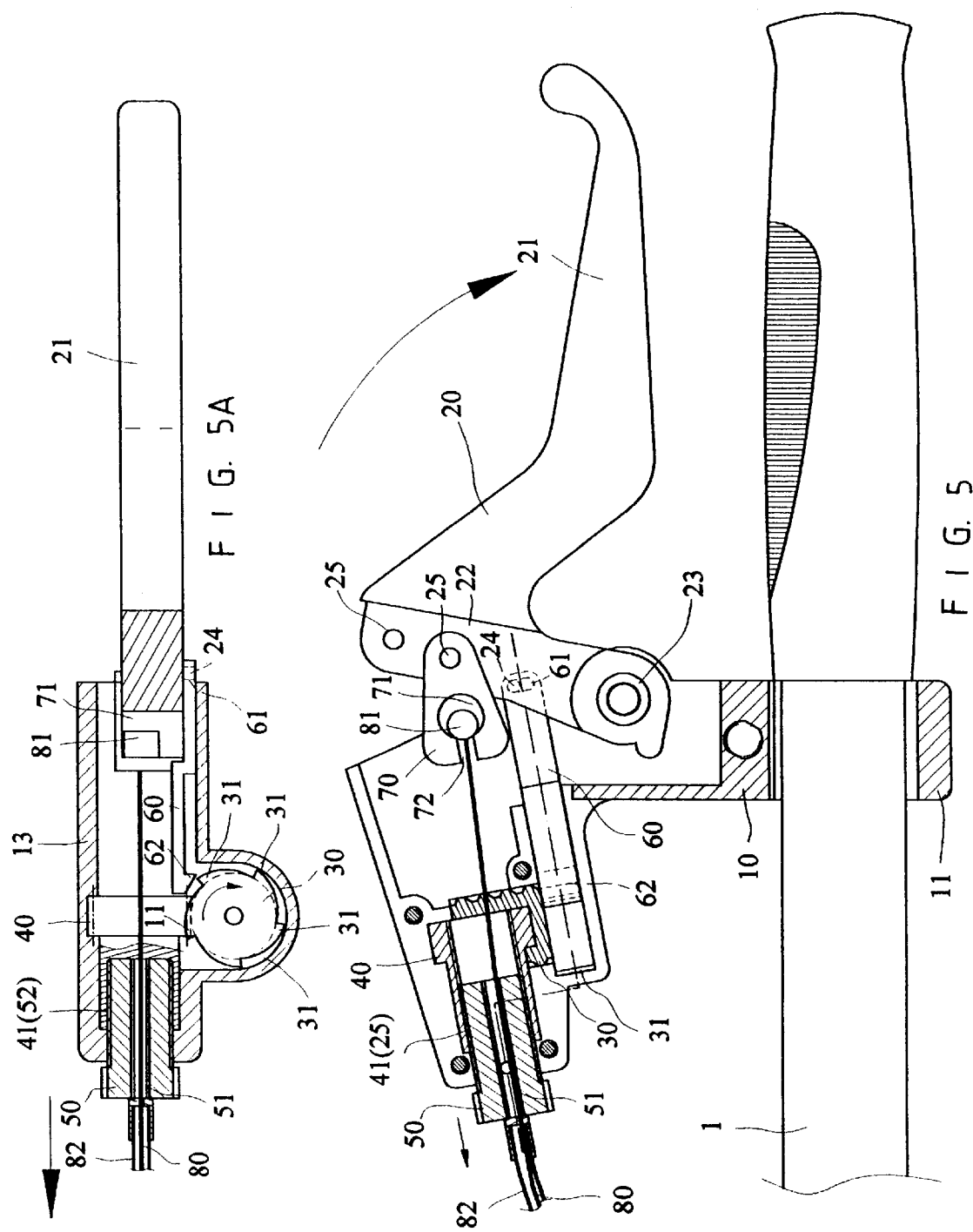
FIG. 5 is a schematic operational view of the automatic tension device of a brake as shown in FIG. 3 in use.

In operation, referring to FIGS. 4 and 5 with reference to FIGS. 2, 3 and 6, when the brake pad 92 is worn to reduce its thickness during a long-term utilization, the braking gap between the brake pad 92 and the tire 100 is enlarged. Thus, the pressing travel of the brake lever 20 is increased, so that the cable 80 is moved through an increased distance to pull the connecting cables 93 upward, thereby increasing the inward swinging angle of the swing arm 91, so that the brake pads 92 may touch and rub the tire 100, thereby capable of providing a braking effect.

Thus, when the cable 80 is loosened and the braking gap between the brake pad 92 and the tire 100 is too large, the user has to exert a larger force to press the brake lever 20, thereby increasing the pressing travel of the brake lever 20 to provide a braking effect. At the same time, the pull hook 60 is moved by the guide rod 24 of the drive arm 22 of the brake lever 20, and so that the one-direction ratchet tooth 62 of the pull hook 60 may move one of the multiple one-direction ratchet teeth 31 of the worm 30 to rotate the worm 30 which meshes with and then rotates the worm wheel 40, so that the gap adjusting screw 50 may be moved axially in a linear manner by rotation of the worm wheel 40. Thus, the gap adjusting screw 50 may be moved to squeeze the cable protection sheath 82, so that the distance of the bushing of the cable protection sheath 82 is enlarged, thereby increasing the lifting distance of the cable 80, so that the braking distance between the brake pad 92 and the tire 100 is shortened.

Accordingly, the automatic tension device of a brake in accordance with a preferred embodiment of the present invention may be used to adjust and shorten the braking gap between the brake pad and the tire automatically.

It is appreciated that, the one-direction ratchet tooth 62 of the pull hook 60 may move one of the multiple one-direction ratchet teeth 31 of the worm 30 under the condition that the braking gap between the brake pad 92 and the tire 100 is too large and the brake lever 20 has a larger pressing travel when the brake pad 92 is worn to reduce a determined thickness. Thus, the cable 80 will not be automatically tensioned under the normal braking condition.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An automatic tension device of a brake, comprising a fixing base, brake lever, a worm, a worm wheel, a gap adjusting screw , a pull hook, a able guide seat, and a cable, wherein:

the brake lever is pivotally mounted on the fixing base;

the worm is received in the fixing base, and has one end having a periphery provided with multiple one-direction ratchet teeth;

the worm wheel is received in the fixing base and meshes with the worm, the worm wheel has an inner wall formed with an inner thread;

the gap adjusting screw is received in the fixing base, the gap adjusting screw has an inner wall formed with a through hole for passage of the cable and has an outer wall formed with an outer thread screwed into the inner thread of the worm wheel;

the pull hook is pivotally mounted on the brake lever, and is provided with an one-direction ratchet tooth that may be locked with one of the multiple one-direction ratchet teeth of the worm;

the cable guide seat is mounted on the brake lever; and the cable is extended through the through hole of the gap adjusting screw and is secured on the cable guide seat.

2. The automatic tension device of a brake in accordance with claim 1, wherein the fixing base is secured on a handlebar of a bicycle and is formed with a pivot hole for pivoting the brake lever.

3. The automatic tension device of a brake in accordance with claim 2, wherein the fixing base is formed with a mounting hole for mounting the handlebar.

4. The automatic tension device of a brake in accordance with claim 1, wherein the fixing base is formed with a first shaft seat, a second shaft seat communicating with the first shaft seat, and a through hole communicating with the second shaft seat, the worm is received in the first shaft seat of the fixing base, the worm wheel is received in the second shaft seat of the fixing base, and the gap adjusting screw is received in the through hole of the fixing base.

5. The automatic tension device of a brake in accordance with claim 4, wherein the through hole of the fixing base is provided with a positioning post, and the outer wall of the gap adjusting screw is formed with a positioning groove for receiving the positioning post of the fixing base.

6. The automatic tension device of a brake in accordance with claim 1, wherein the fixing base has a periphery formed with multiple screw bores, a top cover is secured on the second side of the fixing base, and has a periphery formed with multiple through holes, and multiple screws are in turn extended through the through holes of the top cover, and are screwed into the screw bores of the fixing base, so that the top cover is secured on the second side of the fixing, base.

7. The automatic tension device of a brake in accordance with claim 1, wherein the brake lever is provided with a press portion.

8. The automatic tension device of a brake in accordance with claim 1, wherein the brake lever is provided with a drive arm which is provided with a pivot seat which is pivotally mounted on the fixing base.

9. The automatic tension device of a brake in accordance with claim 1, wherein the brake lever is provided with a drive arm which is provided with a guide rod which is pivotally mounted on the pull hook.

10. The automatic tension device of a brake in accordance with claim 9, wherein the pull hook is formed with an oblong slot for receiving the guide rod of the drive arm of the brake lever.

11. The automatic tension device of a brake in accordance with claim 1, wherein the brake lever is provided with a drive arm which is provided with at least one pivot hole, and the cable guide seat is pivotally mounted on the pivot hole of the drive arm of the brake lever.

12. The automatic tension device of a brake in accordance with claim 1, wherein the cable guide seat is formed with a central hole, and a slit communicating with the central hole, and the cable has a first end extended through the slit of the cable guide seat and provided with a positioning stud secured in the central hole of the cable guide seat, and has a second end which is passed through the through hole of the gap adjusting screw and through a cable protection sheath, and is directly connected to a brake.

* * * * *